D. H. WILSON.
METHOD OF CHARGING STORAGE BATTERIES.
APPLICATION FILED MAY 6, 1911. RENEWED JUNE 27, 1914.

1,126,667.

Patented Jan. 26, 1915.

Witnesses:
Hilding Sjodahl
Marion L. Chandler

Inventor
David H. Wilson
By Attorney
Hill & Simms

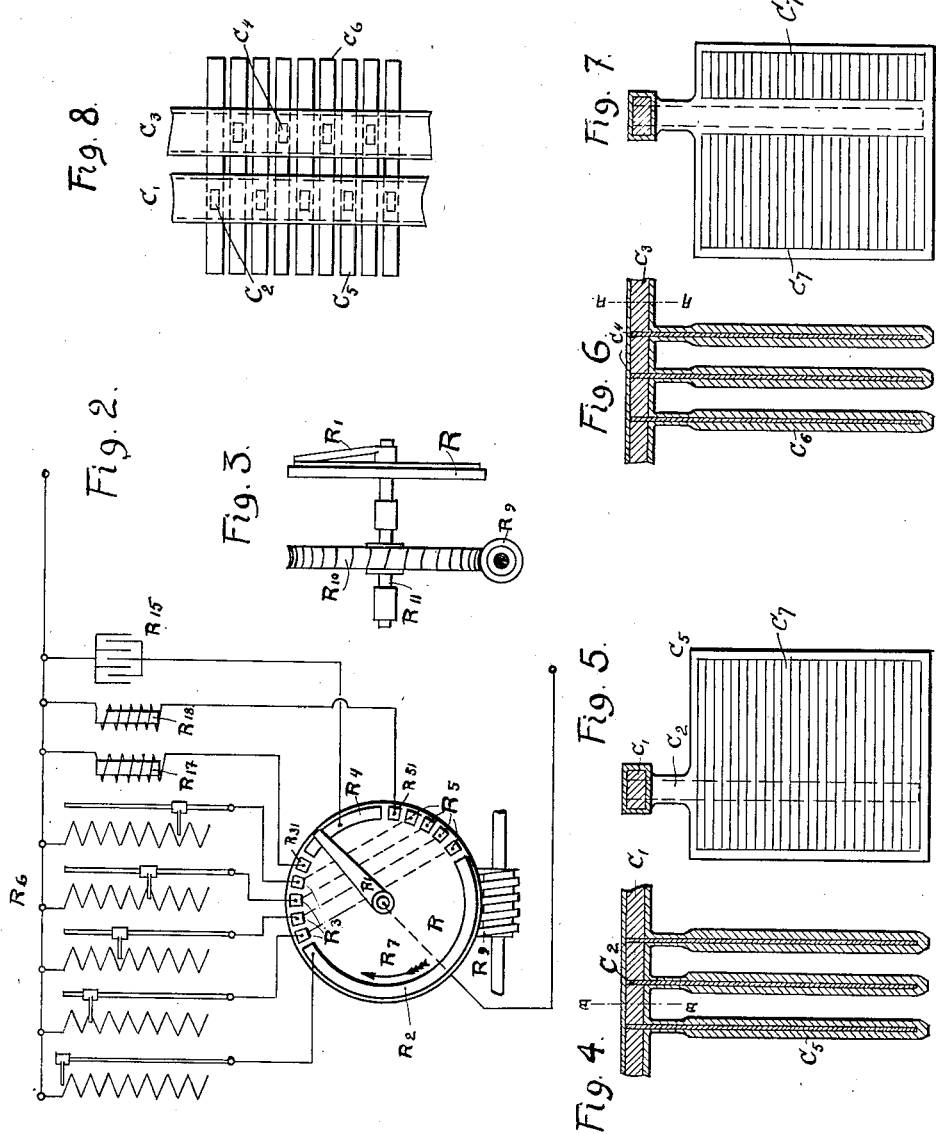

UNITED STATES PATENT OFFICE.

DAVID H. WILSON, OF MEADVILLE, PENNSYLVANIA, ASSIGNOR TO WILSON STORAGE BATTERY COMPANY, OF NEW YORK, N. Y., A CORPORATION OF NEW YORK.

METHOD OF CHARGING STORAGE BATTERIES.

1,126,667.     Specification of Letters Patent.     Patented Jan. 26, 1915.

Application filed May 6, 1911, Serial No. 625,547. Renewed June 27, 1914. Serial No. 847,779.

*To all whom it may concern:*

Be it known that I, DAVID H. WILSON, a citizen of the United States, and resident of Meadville, in the county of Crawford and State of Pennsylvania, have invented a certain new and useful Method of Charging Storage Batteries, of which the following is a specification.

My invention consists in a method of charging storage batteries which has many marked advantages over the systems now known.

One of the objects of my invention is to greatly reduce the time required to store electrical energy in a storage battery. In accomplishing this result I charge the battery with a heavy amperage of current and then reduce it to a reversal of the battery current, thereby creating a condition such as will dissipate the resistance or obstacles to charging created by the heavy charge so as to permit the heavy charge to have an efficient effect upon said plates without undue dissipation of energy in the form of heat, and then charge with the heavy amperage again. The resistance or obstacles to charging at high current rate usually consist in gases generated within the battery by the heavy charging current which tend to insulate the acid solution from the battery plates; or which tend to prevent the passage of current from one to the other. The range of current which lies within the field of my invention may be described as that which will not injure or destroy the battery plates containing low resistance pathways leading into their interiors but which would injure or destroy plates, other conditions being equal, which were not provided with such low resistance pathways.

Another object of my invention is to evenly distribute the charge of current over the plates and corrugations and extend it from the outer portions of the corrugations to the innermost corners.

Another object of my invention is to cause the charge to penetrate into the plates to a considerable depth and to penetrate more or less evenly over the whole corrugated surface of the plates, thus preventing shedding of the plates. In my battery the active material is preferably developed on a plurality of thin ribs.

My heavy charging current by penetrating to the innermost recesses between the ribs and more evenly distributing the forming active material, eliminates all unequal forces due to expansion and contraction of the active material, and thus prevents scaling from and about the ribs. And the interval between heavy charges allows the gases to escape from in and around the forming portions of the plates and thus prevents disintegration or what is called "shedding."

Another object of my invention is to distribute the current evenly through the plates in such a way as to prevent their buckling. This is assisted by running an electrical distributer of high conductivity and considerable surface area into the interior of the plates in such a way as to enlarge the area of contact between each distributer and its plate. This enlarged area of contact and the proper location of the distributers also prevents heating. The area of contact between the distributers and plates is proportioned to the active area of the plates to insure these results.

Another object of my invention is to time the periodical heavy charges of current so as to insure the maximum charging effect and then when the creation of gases interferes with the efficient charging, to again establish efficient charging conditions by the methods mentioned above. When the gases are dissipated sufficiently to permit another efficient charging the amperage is preferably again increased up to the maximum amount which my battery construction makes possible and convenient.

Another object of my invention is to graduate the changes of current from the high amperage to the conditions which dissipate the obstacles to efficient charging in such a way as not to interfere with the general working of the circuit and its efficiency, and to prevent any reversal of the field coils of the charging machine, or short circuiting of the battery through the charging machine.

Another object of my invention is to time the intermittent charging current, or the periodicity of its waves to get the quickest and best results. This is preferably done automatically by means of a motor of some kind, the speed of which is determined and which cuts in and cut out resistances automatically in the shunt fields and thereby the frequency and form of the charging waves is predetermined and fixed to secure efficient results. The motor also manipulates the fields and external circuit by means of the automatic switch.

In the drawings: Figure 1 is a diagram of the circuits and apparatus which I employ to attain my method. Fig. 2 shows a diagram view of the automatic resistance and resistance coil connections. Fig. 3 is a side elevation of portions of the automatic resistance construction. Fig. 4 is a view partly in longitudinal section of a group of battery plates. Fig. 5 is a section thereof taken upon the line B—B, Fig. 4. Fig. 6 is a side elevation with parts in longitudinal section of another group of battery plates for connection to the opposite pole of the charging circuit. Fig. 7 is a section thereof upon the line A—A. Fig. 8 is a plan view of the plates and their connections to cell buss bars. Fig. 9 shows a current wave from a high amperage to a reverse amperage value.

In Fig. 1 I employ a dynamo D having a shunt field $D^1$ and a series field $D^2$. A switch is employed having a lever S adapted to come into contact with the contact points $S^1$ and $S^2$ which leaves the dynamo with both series and shunt field coils in active condition to charge an ordinary battery. The switch S may be thrown over to close the circuit, at the contacts $S^3$ and $S^4$, thereby short-circuiting the series field circuit $D^2$, and also making independent contact from $S^5$ and $S^6$ which closes the circuit 3 and 4 to the terminals of a steady current supply 11, 12, so as to operate the motor which drives the automatic resistance R and leaves the shunt coil $D^1$ in circuit through the following conductors and apparatus:— brush $G^1$ of the dynamo, field shunt $D^1$, conductor 1, automatic resistance brush $R^1$ of the automatic resistance R, some one of the contacts $R^2$, $R^3$, $R^4$ or $R^5$ through some one of the resistance coils $R^6$ or reversing switch coils $R^{17}$ and $R^{18}$ connected thereto and brush $G^2$. The coils $R^6$ have varying degrees of resistance thus varying the resistance or ampere field turns and hence varying or controlling the output of the charging machine.

The battery $B^2$ is of the particular type shown by the applicant in the drawings; or it may be of any other type which is capable of being charged by applicant's method.

My preferred method of varying the charging current to the battery $B^2$ is accomplished by the relation of the different mechanism and circuits shown in the drawing. The automatic resistance brush $R^1$ is caused to revolve in the direction of the arrow $R^7$ and to establish the circuit from the dynamo brush $G^1$ through shunt field $D^1$, the conductor 1, the automatic resistance brush $R^1$, contact $R^2$ of the automatic resistance, to a coil $R^6$ of the automatic resistance R, thence by the conductor 2 to the brush $G^2$. This circuit has a varying automatic resistance; and since the automatic resistance is in series with the shunt field of the charging apparatus, a varying amperage is developed and delivered to the battery. It may amount to seven tenths amperes per square inch of plate surface as heretofore mentioned, or the current may be reversed. As the brush $R^1$ travels over the contacts $R^3$ the amount of current that is permitted to pass through the automatic resistance connections is decreased from contact to contact owing to the fact that higher resistances are introduced into the shunt field circuit until finally the brush reaches the contact $R^{31}$ which is connected to the reversing switch coil $R^{17}$ which breaks the external charging circuit to the battery $B^2$ and throws across the terminals of the battery the resistance 14, thus allowing the circuit of the battery to be reversed. The reversal of the charging current causes a removal of the obstacles to charging. The particular feature which removes the obstacles to the prolongation of heavy charging of the battery is the breaking down of the sulfate which fills the voids between and around the molecules of the metal. If the plates being charged are placed in a transparent glass jar the dense and heavy acid can be seen to travel down the plates to the bottom of the jar thereby setting up a circulation of the electrolyte which in turn sets up a positive removal of the obstacles to the prolongation of the charge.

The coil $R^{17}$ attracts the armature and switch lever $R^{16}$, which shifts the battery from the charging circuit to the local reversing circuit, as follows: battery $B^2$, conductor 18, switch lever $R^{16}$, contact point 13, high resistance 14, conductor 15, back to the battery. When the lever leaves contact 16 the circuit from the charging machine over conductors 17 and 18 is opened, so that the battery is disconnected from the charging machine. The resistance 14 is so adjusted to the battery $B^2$ that a small amount of current is allowed to be discharged from the battery which has the function of dissipating the gases or obstacles to charging which were created by the heavy charge of current when the brush $R^1$ rested upon the contact plate $R^2$. The amount of current that is permitted to pass may be almost anything that is desired. One one hundredth of an ampere per square inch of plate surface is sufficient. This amount of discharge, however, varies with the potential of the battery. As the charge progresses and as the potential of the battery rises, the charging current increases the gas formation in proportion to the periods of charging. As the resistance, by means of which the battery current is reversed, is constant, and as the potential of the battery increases, the discharged current increases in quantity. This has the effect of decreasing the time in which the obstacles to charging are dissipated.

Inspection of a battery when reversed after it has been subjected to a heavy charging current, reveals how the gases upon the opposite plates of the battery are suddenly thrown off from the plates into the electrolyte where they disappear. This action is very rapid when the current is reversed and the rapidity varies with the amount of reversed current that flows through the resistance. Hence it is true that as the charging current creates an increasing resistance to charging as the potential rises, the effect of the increasing reverse current dissipates this resistance to charging with corresponding effect. These factors may be made proportionate by suitable adjustments between them. The brush $R^1$ travels on to the contact plate $R^4$, engaging the plate $R^4$ electrically before it leaves the plate $R^{31}$. The circuit from the brush $R^1$ is then transferred from the coil $R^{17}$ to the condenser $R^{15}$ which protects the field coils of the charging machine and the other windings in the circuit and apparatus. It is not essential that the circuit of the shunt field coils should be broken by the condenser $R^{15}$ in order that the battery may be reversed. Any suitable provision to take care of the current from the charging machine may be substituted in place of the broken circuit, when the battery is disconnected from the charging circuit. As the brush $R^1$ travels onward in the direction of the arrow $R^7$ it passes on to the contact $R^{51}$, thereby connecting the current from the charging machine to the coil $R^{18}$, which acting upon the switch lever $R^{16}$ reverses it to the contact point 16, thereby restoring the battery $B^2$ to the charging circuit. When the brush $R^1$ passes from the contact $R^{51}$ it passes successively over the contacts $R^5$ which successively decrease the resistance introduced into the circuit of the shunt field coil in such a way as to cause a larger and larger volume of current to flow through the battery until the brush $R^1$ has reached the contact $R^2$ again. I prefer to time this automatic resistance so that it makes approximately 16 to 17 revolutions an hour. I find that it may remain upon the contact $R^2$ for about 170 seconds. The current is then "stepped down" in probably 10 seconds to the reversal through the contact $R^{31}$. The brush $R^1$ rests upon the contact $R^4$ perhaps nearly 30 seconds and then the circuit is rapidly "stepped up" so that larger and larger amounts flow through the battery as the brush $R^1$ passes over the contacts $R^5$ and reaches the contact $R^2$. These periods of time preferably vary with the various changes of my method so as to give the most efficient results.

In Fig. 2 the automatic resistance R is shown together with the contact connections; also how the arm $R^1$ is driven by the worm $R^9$ which in turn is driven by the motor M which is capable of speed regulation as by a rheostat $M^1$. The object of this arrangement is to automatically drive the brush $R^1$ over the automatic resistance contacts and to regulate the time of the current waves delivered to the battery in such a way that the periodicity of the charges or amperage supplied to the battery is predetermined and regulated.

In Fig. 3 the worm $R^9$ is shown meshing with the worm gear $R^{10}$ which is fixed to the shaft $R^{11}$ which carries the brush $R^1$.

In Fig. 4 is shown the copper busses $C^1$ connected to the copper distributers $C^2$ which pass through the plates $C^5$ substantially to the bottom, thereby furnishing a large area of contact in the interior of the plate between the distributers which have high conductivity, and the plates which have comparatively low conductivity. The wide area of contact between the two metals permits the heavy amperage of current to pass from a distributer to the lead or other material in the plate over such a large surface that it has no opportunity to heat as it would have if the surface was small in area. The location of the distributers also distributes the charge evenly on opposite sides of the plates and ribs $C^7$ and over their surfaces.

In Fig. 5 the distributers $C^2$ are indicated in broken lines where they extend substantially to the bottom of the plates.

Fig. 6 shows the alternate set of plates having the buss $C^3$ and the plate distributers $C^4$.

Fig. 7 shows a side elevation thereof where the distributers $C^4$ extend down through the plates $C^5$ substantially to the bottom.

Figures 1, 9:
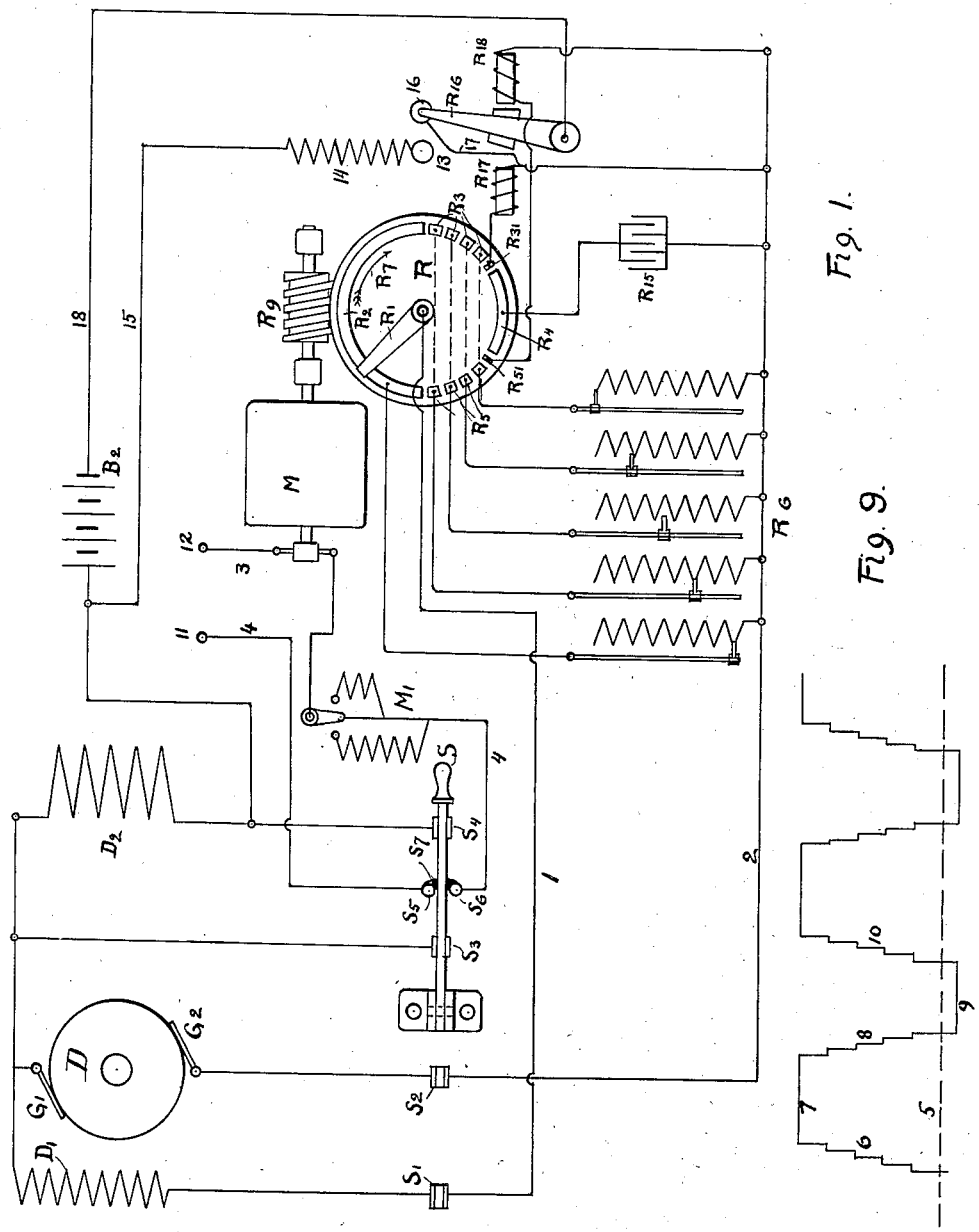

Fig. 8 shows the longitudinal busses $C^1$ and $C^3$ together with the distributers $C^2$ and $C^4$ so alternated as to furnish paths of more or less equal resistance from one electrode to the other; or from a negative distributer to a positive distributer, and so distribute the passage of the current from the distributer to the plates that it conducts the current evenly over the whole surface of the plate.

In Fig. 9 is shown the wave form of the charging current. Taking the line 5 as zero, the current is stepped up through resistances in such a way that its wave formation may be indicated by the stepped line 6; until full amperage is attained as indicated by the line 7. The current is then stepped down, as indicated by the line 8, to the reversal indicated by line 9, and then up as shown.

In operating my method I throw the switch S so that it engages contact points S³ and S⁴, thus throwing the shunt field coils and the automatic resistance into operative relation with the charging machine armature to vary the amperage delivery of the charging machine. The automatic resistance varies the resistance in the shunt field coil circuit periodically, causing the charging machine to deliver seven tenths amperes per square inch plate surface or thereabout for the periods stated, and then the amperage is dropped down by degrees to the reversal until the gases have disappeared and then the amperage is again raised to a heavy charge. This process continues until the battery has been charged, when it is disconnected from the circuit.

Having thus described my invention, what I claim as new and desire to secure by Letters Patent is:

1. The method of charging a storage battery having plates composed of lead or equivalent material containing low resistance pathways adapted to lead the current into the interior of the plates which consists in applying thereto periodically a charging current having an amperage per square inch of plate surface within the amount that may be applied thereto and maintain the efficiency of said plates, and greater than the amount which, other conditions being equal, would injure or destroy plates composed entirely of high resistance metal, said periods being separated by intermissions characterized by reversal of charging current, to cause the dissipation of the obstacles to charging created by said charging current.

2. The method of charging a storage battery having plates composed of lead or equivalent material containing low resistance pathways adapted to lead the current into the interior of the plates which consists in applying thereto periodically a charging current having an amperage per square inch of plate surface within the amount that may be applied thereto and maintain the efficiency of said plates, and greater than the amount which, other conditions being equal, would injure or destroy plates composed entirely of high resistance metal, said periods being separated by intermissions characterized by reversal of charging current to cause the dissipation of the obstacles to charging created by said charging current, the periods of charging being limited to the time during which the plates may be steadily charged with efficiency and said intermissions being limited to the time required to free the plates substantially from said obstacles.

3. The method of charging a storage battery having plates composed of lead or equivalent material containing low resistance pathways adapted to lead the current into the interior of the plates which consists in applying thereto a charging current having an amperage per square inch of plate surface within the amount that may be applied thereto while maintaining the efficiency of said plates and greater than the amount which, other conditions being equal, would injure or destroy plates composed entirely of high resistance metal; and positively causing the removal of obstacles to charging created by the charging current.

4. The method of charging batteries which consists in causing an electrical current of large amperage to enter the plates until further efficient application of said heavy charging current is prevented by obstacles created thereby and then automatically dropping off said current from said high amperage to a reversal of the battery current until said obstacles to efficient charging created by said charging current of large amperage are eliminated and then renewing said heavy charge.

5. The method of charging a storage battery which consists in applying intermittent currents having a heavy charging capacity and gas creating capacity to said battery, alternated with periods of reversal of battery current, said periods of reversal having a gas dissipating capacity, said heavy charging current being so alternated with said periods of reversal substantially periodically said periods being regulated in length substantially to the time when gas formation prevents efficient charging and gas dissipation permits efficient charging.

Signed at New York in the county of New York and State of New York this 13th day of April, A. D. 1911.

DAVID H. WILSON.

Witnesses:
MYRON F. HILL,
A. L. TRAVIS.